April 28, 1959     E. L. CONNELL     2,884,103
PREDETERMINED TORQUE RELEASE MECHANISM
Filed April 8, 1954     2 Sheets-Sheet 1
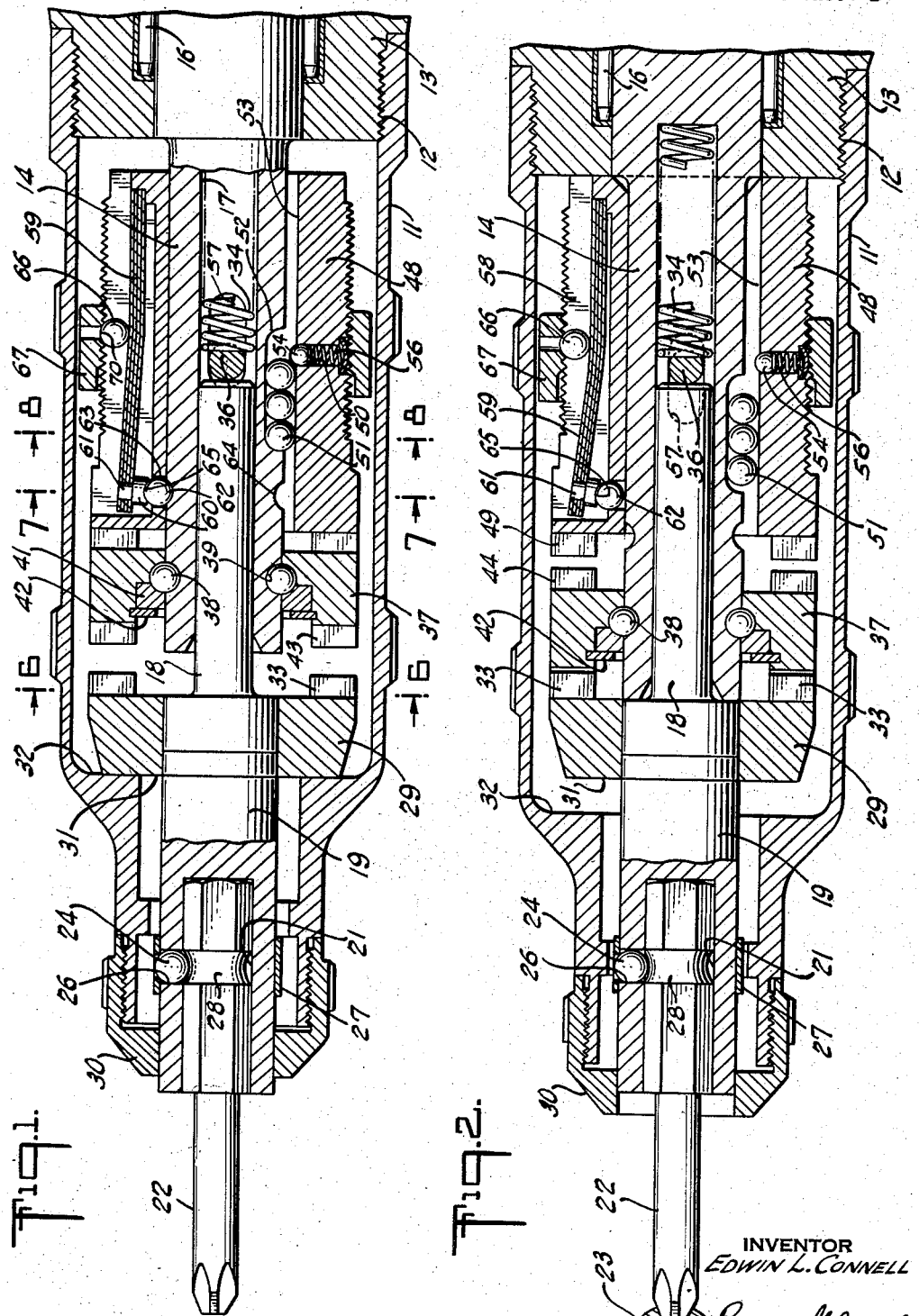
INVENTOR
EDWIN L. CONNELL
ATTORNEY

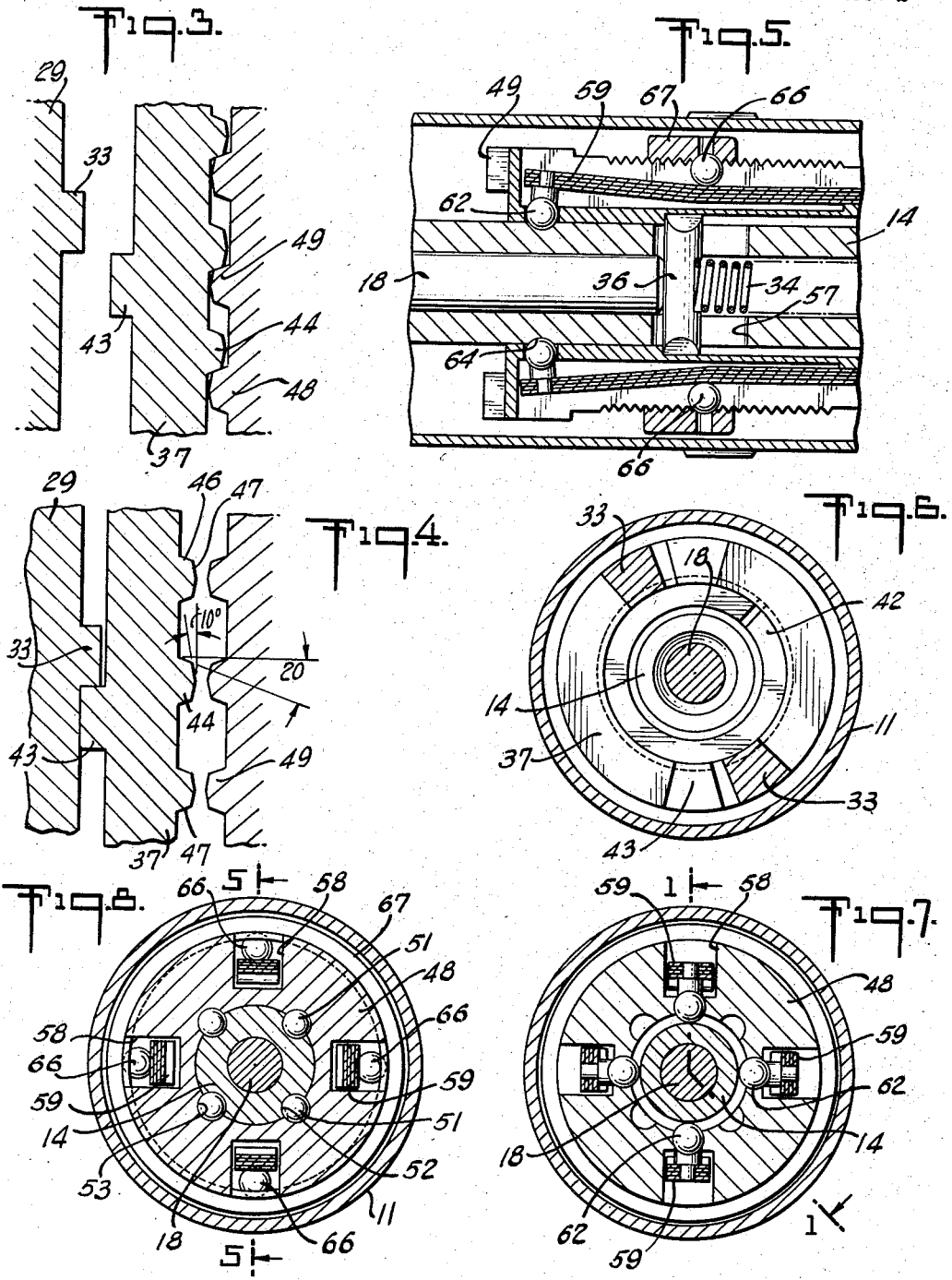

United States Patent Office 2,884,103
Patented Apr. 28, 1959

2,884,103

PREDETERMINED TORQUE RELEASE MECHANISM

Edwin L. Connell, Utica, N.Y., assignor to Chicago Pneumatic Tool Company, New York, N.Y., a corporation of New Jersey Application April 8, 1954, Serial No. 421,731

9 Claims. (Cl. 192—56)

This invention relates to a predetermined torque release mechanism, and more particularly to a torque release mechanism for use in a threaded fastener setting tool.

In running up and setting threaded fasteners, such as nuts, screws and bolts, and particularly in high volume production operations on assembly lines, it is desirable to utilize power driven tools having predetermined torque release means whereby the threaded fasteners are all set at a rapid rate, and with a uniform and predetermined final stress. Many types of torque release mechanisms for such tools have been proposed and used with varying degrees of success and/or satisfaction. The torque release mechanisms of the prior art, often employ a spring to hold clutch elements in mesh before torque release at predetermined load; such spring arrangements have the undesirable property of continuing to urge the clutch elements into engagement after torque release, thereby causing repeated re-engagement under impact, or ratcheting, thus causing rapid wear of the clutch elements. The present invention represents an improvement in a torque release mechanism of the prior art, and which is particularly adaptable for use in power driven threaded fastener setting tools.

The principle of operation of the torque release mechanism of the invention resides in the use of a driving clutch element mounted upon a driving shaft for rotation therewith, and further arranged for longitudinal movement relative to the shaft. The clutch element has a set of cam-shaped clutch jaws for engagement with a set of complementary cam-shaped clutch jaws formed upon a driven clutch element. A holding means in the form of a plurality of ball members, is positioned in holes formed in the driving clutch element, said balls being adapted to enter a groove formed on the outer surface of the driving shaft when the clutch jaws are engaged. A set of leaf springs is arranged to urge each ball toward the driving shaft, while an adjusting means is provided to regulate the pressure of each set of leaf springs against its respective ball. When the torque load upon the driven clutch element reaches a predetermined value, the driving clutch element is cammed out of engagement with the driven clutch element and simultaneously disrupts the holding means, whereupon the rotary motion of the driven element is interrupted. It will be seen that the predetermined torque value for declutching depends primarily upon the amount of spring pressure exerted upon the balls, since the driving clutch element must force the balls out of the shaft groove against the pressure of each leaf spring set, as the driving element is cammed out of engagement with the driven clutch element.

The main object of this invention is to provide a torque release mechanism which will interrupt rotary movement of a driven element upon realization of a predetermined torque load applied to the driven element.

A further object is to provide a torque release mechanism which is well suited for use in a threaded fastener setting tool.

Another object of the invention is to provide a torque release mechanism having an adjusting means whereby the mechanism can be conveniently set for torque release at any predetermined value within the range for which the mechanism is designed.

A further object is to provide a torque release mechanism wherein a spring is arranged to indirectly resist declutching of clutch elements prior to attainment of a predetermined torque load, without causing reclutching movement of said elements after declutching.

An object of the invention is to provide a torque release mechanism which is simple in structure, rugged in design, easy to adjust, reliable in use, of low initial and maintenance cost, and which will give many hours of satisfactory service.

Another object is to provide a torque release mechanism wherein the resistance to disengagement of the driving clutch decreases during clutch disengaging movement, whereby wear on the clutch jaws is maintained at a minimum.

In the accompanying drawings:

Fig. 1 is a longitudinal sectional view illustrating an embodiment of the invention as applied to a threaded fastener setting tool, and showing the latter in non-operative condition;

Fig. 2 is a longitudinal sectional view of the tool illustrated in Fig. 1, but showing the tool in operative condition and just after a declutching phase in tool operation;

Fig. 3 is a development view of clutch teeth and jaws used in the tool of Fig. 1, and in the relative position associated with the condition of the tool as in Fig. 1;

Fig. 4 is a development view of the clutch teeth and jaws as in Fig. 3, but illustrating the clutch jaws in the relative position associated with the condition of the tool as in Fig. 2;

Fig. 5 is a fragmentary longitudinal sectional view of the tool of Fig. 1, but as viewed at 90° from the position illustrated in Fig. 1;

Fig. 6 is a cross-sectional view as seen from line 6—6 in Fig. 1;

Fig. 7 is a cross-sectional view as seen from line 7—7 in Fig. 1; and

Fig. 8 is a cross-sectional view as seen from line 8—8 in Fig. 1.

(Figs. 1 to 5 are taken as seen from lines 1—1 and 5—5 in Figs. 7 and 8 respectively.)

Referring now to the drawings, numeral 11 refers to a housing, or casing, which encloses an embodiment of a torque release mechanism of the invention, and which is threadably secured at 12 to a portion 13 of a rotary power source, such as a pneumatic, or electrical motor (not shown). Extending from the motor, and rotatably driven thereby through the usual gear reduction (not shown) is a drive shaft 14, which is supported in the motor portion 13 by means of needle bearings 16. The portion of the drive shaft 14 enclosed by the housing 11, contains an axial bore 17 in which is slidably supported a reduced diameter projection 18 of a spindle 19. The forward end of the spindle has a hexagonal bore 21, which is adapted to receive a tool bit 22 of a conventional type for operation on a work piece, such as a screw 23, a portion of which is shown in Fig. 2. Tool bit 22 is held in the bore 21, by means of a ball 24 which is maintained within a hole 26 in the spindle 19, by ring spring 27, which urges the ball 24 into engagement with a groove 28 formed upon the surface of the tool bit. A housing cap 30, threadably secured to the front end of the housing 11, provides the dual function of partially supporting the spindle 19, and keeping dirt out of the housing. A lower driven clutch element 29, fixedly secured to the spindle 19, is arranged so that a front surface 31 thereof, will abut a shoulder 32 formed in the forward end of the housing 11. On the rearward side of the clutch element 29 are a pair of diametrically disposed clutch jaws 33. A reset spring 34 is compressively maintained within the bore 17, one end of the spring seating on the bottom of bore 17, while the other end of the spring abuts a reset pin 36, the latter of which engages the end of spindle projection 18 to urge the spindle forwardly, whereby the clutch surface 31 seats upon the housing shoulder 32.

Rotatably mounted upon the drive shaft 14, and near the forward end, is an intermediate driven clutch element 37. The latter is fixed against axial movement upon the drive shaft, by means of a plurality of balls 38, which ride in a circumferential groove 39 formed on the periphery of the drive shaft 14, and which also ride in a groove formed partly in the clutch element 37, and partly in a ball race bushing 41, the latter of which is held in position by means of a ring 42 secured to the clutch element 37, all as will be best seen in Fig. 1 or 2. On the forward side of the clutch element 37, are a pair of diametrically disposed clutch jaws 43, which are similar in shape and size to the clutch jaws 33 formed on clutch element 29, while on the rearward side are formed a plurality of clutch teeth 44, each having symmetrically disposed camming surfaces 46 and 47. As will be noted in Figs. 3 and 4, the sides of each tooth forming camming surfaces 46 are sloped 20°, while the crest portions forming camming surfaces 47, have crest angles of 10°; the cam angles given are merely representative, and may be varied as desired for different operating chaarcteristics, as will be appreciated.

Slidably mounted upon the drive shaft 14 is a driving clutch element 48, having on a forward surface a plurality of clutch teeth 49, which are of the same number, size, and proportions as clutch teeth 44. As will be seen in Fig. 3, sufficient space is allowed between each tooth 44 and 49, so that full engagement between teeth 44 and 49 is permitted. The driving clutch element 48 is arranged for axial movement upon the drive shaft by four sets of balls 51 which ride in longitudinal grooves 52, 53 formed upon the drive shaft 14 and clutch element 48 respectively. A ball 54 is arranged in a hole 50 having a rounded end, whereby the ball 54 will project into each groove 53; a spring 56 is compressively arranged in hole 50. In such manner the balls 51 are maintained in close contact when the tool is in non-operative condition, as illustrated in Fig. 1 whereby to permit easy rolling action when the driving element 48 is moved to the position illustrated in Fig. 2.

As best seen in Fig. 5, the reset pin 36 extends at each end through slots 57 formed in the drive shaft 14, and is arranged to engage the driving clutch element 48, so that the latter can be urged forwardly into clutching engagement by action of spring 34. Four equi-spaced radial slots 58 are formed in the driving clutch element 48, each of which receives a set of leaf springs 59. At the forward end of each leaf spring set is a button 60, which engages a ball 62 maintained in a hole 63 formed in the driving element 48. The button 60, has an extension 61 which is press fitted into holes formed in the spring set 59, and has a spherical recess 65, which fits the ball 62, as shown. The leaf spring sets constantly urge the balls 62 radially inward into contact with the drive shaft 14. When the driving element 48 is in position as shown in Fig. 1, the balls 62 enter a circumferential groove 64 formed on the drive shaft 14. Means to adjust the tension of each leaf spring set 59 is provided in the form of four balls 66, arranged atop each spring set, and which are seated in a circumferential groove 70 formed in an adjusting nut 67. The adjusting nut 67 is threadably mounted upon the driving element 48; by moving the balls 66 forwardly via adjusting ring 67, the holding force on balls 66 is increased, thus increasing the torque cut-off value, as will be seen.

In operation, the tool is positioned so that the tool bit 22 engages the work piece 23, and longitudinal pressure is exerted upon the motor and associated housing 11 by the tool operator so that the clutch jaws 43 are moved forwardly into engagement with the clutch jaws 33, as illustrated in Fig. 4. It may be pointed out that prior to such movement the relative parts of the mechanism are in the position shown in Fig. 1; also the tool motor is preferably operating so that the parts of the torque release mechanism, which are mounted upon the drive shaft 14, are rotating therewith. With the clutch parts thus engaged, rotary motion of the drive shaft 14 is transmitted to the tool bit 22 via the balls 51, driving element 48 and clutch teeth 49 thereof, clutch teeth 44 and clutch jaws 43 of the intermediate driven clutch element 37, and clutch jaws 33 of the lower driven clutch element 29.

During the early stage of work piece run-up, the resistance to rotation is relatively small, and the torque load is insufficient to cause any camming action between the clutch teeth 44 and 49. However, once the work piece begins to be set in final position, the torque load rises very rapidly, to the point where the driving clutch element 48 is moved rearwardly upon the drive shaft 14, due to the camming action between clutch teeth 44 and 49. Before such rearward movement of the driving clutch element 48 can be effected, the resistance of the balls 62 against being disengaged from the shaft groove 64, must be overcome. As will be apparent, such resistance will depend primarily upon the degree of holding force exerted upon each ball 62 by the leaf spring set 59. As soon as the balls 62 are displaced from the shaft groove 64, the driving clutch element 48 will be moved to the position shown in Fig. 2, and rotary action of the tool bit will be interrupted. Ample clearance between the clutch teeth 44 and 49 upon disengagement will be realized because once the balls 62 are forced out of shaft groove 64, the camming action, or energy, will be fully utilized in rapidly moving the driving clutch element rearwardly upon the drive shaft; in other words the driving clutch element is thrown clear by inertia. The clearance thus established between clutch teeth 44 and 49, will avoid rubbing or ratcheting effect thereupon, which could cause rapid wear. Furthermore, it is to be noted that the leaf springs 59 exert an increased holding force upon the balls 62, which frictionally engage a cylindrical surface on shaft 14 when the latter are out of the shaft groove 64, which assures that the driving element 48 will not move forwardly into re-engagement with the driven element, until desired by the operator. The action thus described distinguishes from prior art torque release mechanisms, wherein a spring is used to maintain the clutch parts in engagement, and which continues to exert compressive force after disengagement, thereby causing ratcheting and resulting in increased wear.

It is to be further noted that as the balls 62 are forced out of groove 64, during the rearward movement of the driving clutch element, they progressively offer less resistance to being dislodged, with the result that the frictional force between the clutch jaws 44 and 49 is lessened, thereby providing minimum wear on the clutch jaws. In prior art devices, wherein a compression spring is used to maintain the clutch jaws in engagement, the resistance to disengagement of the driving clutch, increases during clutch disengagement movement, which results in higher friction between the clutch jaws, thereby producing increased clutch jaw wear.

To reset the torque release mechanism for subsequent operation, it is only necessary to release longitudinal pressure upon the housing 11, whereupon the reset spring 34 will cause the various parts to be moved back into the position shown in Fig. 1.

It should now be apparent that the invention as described, is extremely simple in structure and operation, and should provide a torque release mechanism that is highly efficient, easily adjustable, and well suited for certain types of applications. While the invention has been described as embodied in a threaded fastener setting tool, it will readily appear that it is not limited to such an application, but may be satisfactorily applied in other devices wherein torque release at predetermined load is desired.

What is claimed is:

1. A torque release mechanism including a drive shaft, a driven clutch element rotatable on the shaft and restrained against axial movement, a driving clutch element axially slidable on the shaft and arranged to rotate with it, the driven clutch element having clutch teeth about an end thereof, the driving clutch element having an elongated body, clutch teeth at an end of the latter normally engaged with those of the driven clutch element and adapted to be forced out of such engagement upon the driven clutch element realizing a predetermined torque load, a plurality of circumferentially spaced slots formed longitudinally in the body of the driving clutch element, a radially extending hole formed at one end of each slot in a bottom wall thereof, a detent in each hole normally engaged in a peripheral recess about the shaft when the driven and driving clutch elements are engaged, an elongated leaf spring disposed in its entirety in each slot, one end of the spring being supported at one end of the slot and the other end overlying the related detent, a ball in each slot movable axially over the surface of the leaf spring therein, and a ring nut threadable along the body of the driving clutch element and over the several slots and providing an annular inner recess in which the several latter mentioned balls are seated, said last mentioned recess cooperating with the leaf springs to restrain the balls against axial movement relative to the ring nut whereby threading of the ring nut in either direction carries said balls with it over the leaf springs and serves to simultaneously adjust the loads of the several leaf springs on the detents.

2. A torque release mechanism as in claim 1, wherein the leaf springs are of laminated structure.

3. A torque release mechanism as in claim 1, wherein the supported end of each leaf spring is at a level in the related slot further inward radially than the end of the spring which overlies the detent.

4. A torque release mechanism as in claim 1, wherein the detent in each hole is a ball detent and the end of each leaf spring overlying the detent carries a button on its underside having a concave face complementary to and engaging the related ball detent.

5. In a tool including a drive shaft, a torque transmitting clutch element arranged to rotate with the shaft and adapted to slide from a normal position on the shaft upon meeting with an overload resistance, the said clutch element having an elongated body, a plurality of circumferentially spaced slots formed longitudinally therein, a radial hole formed at one end of each slot in a bottom wall thereof, a ball detent in each hole protruding in part above and below the bottom wall, the protruding lower portion of each ball detent being engaged in the normal position of the clutch element in a peripheral recess about the shaft, said ball detent being arranged to disengage from the peripheral recess and thereupon roll over the surface of the shaft in an axial direction, an elongated leaf spring disposed in each slot, one end of the spring being supported at one end of the slot and the other end overlying the projecting upper portion of the ball detent, the supported end of the spring being at a lower level in the slot than the opposite end, a ball in each slot movable axially over the surface of the leaf spring therein, and a ring nut threadable over the body of the clutch element and having an annular inner recess in which the several latter mentioned balls are seated, said annular recess cooperating with the leaf springs to restrain the associated balls against axial movement relative to the ring nut whereby threading of the ring nut in either direction carries said balls with it over the leaf springs and serves to vary the loads of the springs on the detent balls accordingly as the ring nut is moved in one direction or the other.

6. A torque release mechanism including a drive shaft, a drive clutch element rotatable on the shaft and restrained against axial movement, a driving clutch element axially slidable on the shaft and arranged to rotate with it, the driven clutch element having clutch teeth about an end thereof, the driving clutch element having an elongated body, clutch teeth carried at an end of the latter normally engaged with those of the driven clutch element and adapted to be forced out of such engagement upon the driven clutch element realizing a predetermined torque load, at least one elongated slot formed longitudinally in the body of the driving clutch element, a radially extending hole formed at one end of the slot, a detent in the hole normally engaged in a peripheral recess about the shaft when the driven and driving clutch elements are engaged, an elongated leaf spring disposed in the slot, one end of the spring being supported at one end of the slot and the other end overlying the detent, a ball in the slot movable axially over the surface of the leaf spring, and a ring nut threadable along the body of the driving clutch element and over the said slot and providing an annular inner recess in which the ball is seated, said annular recess cooperating with the leaf spring to restrain the ball against axial movement relative to the ring nut whereby threading the ring nut in either direction carries the ball with it over the leaf spring and serves to adjust the load of the spring upon the detent.

7. A device comprising a drive shaft, a cylindrical driving clutch element axially slidable on the shaft and arranged for rotation with it, the driving clutch element adapted in a normal position to engage with a driven clutch element and adapted upon development of an overload in the driven element to be forced by the latter out of such engagement to a position on the shaft removed from normal, spring loaded detent means holding the driving element in its normal position and tending to retain it on the shaft in its removed position, and means for overcoming the load of the detent means in the removed position of the driving element and restoring the latter element from its removed position to its normal position, the latter means comprising a reset pin projecting radially through a longitudinally elongated slot in the shaft and having its ends disposed in opposed longitudinal channels in the inner wall of the driving element, the pin being slidable longitudinally of the slot and in the channels, the channels each including an abutment against which the ends of the pin normally limit in a normal position of the driving element, and resilient means compressed in a bore of the shaft urging the pin to its normal position.

8. A device as in claim 7, wherein means is provided for displacing the pin from its normal position when the driving and driven elements are engaged whereby the driving element is relieved of the load of the compressed resilient means.

9. A device comprising a drive shaft having a bore opening out through one end, a driven double ended clutch element rotatable on the shaft and restrained against axial movement, a cylindrical driving clutch element axially slidable on the shaft and arranged for rotation with it, the driving clutch element adapted in a normal position to engage with one end of the driven clutch element and adapted upon development of an overload in the driven clutch element to be forced axially out of such engagement to a position on the shaft removed from normal position, spring loaded detent means normally holding the driving clutch element in its normal position and adapted to retain it in its disengaged position on the shaft, means for overcoming the load of the detent means in the disengaged position of the driving clutch element and restoring the latter element axially to its normal position, the latter means comprising a reset pin projecting radially through a longitudinally elongated slot in the shaft and having its ends disposed in opposed longitudinal channels in the inner wall of the driving clutch element, the pin being slidable longitudinally of the slot and the channels, the channels each including an abutment against which the ends of the pin limit in a normal position of the driving clutch element, resilient means compressed in the bore of the shaft between a dead end of the bore and the pin and urging the pin in the slot to its normal position, and a further clutch element adapted to be engaged with the opposite end of the driven clutch element, the further clutch element including an axial extension for carrying a work engaging tool and including an oppositely extending plunger slidable in the bore of the driving shaft into abutment with the pin, the plunger being adapted upon application of axial pressure to the axial extension to displace the pin against the load of the spring and to carry the further clutch element into engagement with the said opposite end of the driven clutch element.

References Cited in the file of this patent

UNITED STATES PATENTS

| | | |
|---|---|---|
| 1,881,728 | Levedahl | Oct. 11, 1932 |
| 2,144,769 | Melmer | Jan. 24, 1939 |
| 2,441,038 | Siesel | May 4, 1948 |
| 2,765,059 | Amtsberg | Oct. 2, 1956 |
| 2,773,370 | Intraub et al. | Dec. 11, 1956 |

FOREIGN PATENTS

| | | |
|---|---|---|
| 554,046 | Germany | July 1, 1932 |
| 843,776 | Germany | July 8, 1949 |